(12) United States Patent
Kim

(10) Patent No.: US 12,194,418 B2
(45) Date of Patent: Jan. 14, 2025

(54) BENDABLE FLEXIBLE FLAT MEMBRANE MODULE AND METHOD FOR MANUFACTURING SAME

(71) Applicant: Chang Yong Kim, Siheung-si (KR)

(72) Inventor: Chang Yong Kim, Siheung-si (KR)

( * ) Notice: Subject to any disclaimer, the term of this patent is extended or adjusted under 35 U.S.C. 154(b) by 0 days.

(21) Appl. No.: 16/763,993

(22) PCT Filed: Nov. 15, 2018

(86) PCT No.: PCT/KR2018/013977
§ 371 (c)(1),
(2) Date: May 14, 2020

(87) PCT Pub. No.: WO2019/098694
PCT Pub. Date: May 23, 2019

(65) Prior Publication Data
US 2020/0391159 A1    Dec. 17, 2020

(30) Foreign Application Priority Data

Nov. 15, 2017  (KR) .................. 10-2017-0152027

(51) Int. Cl.
| | | |
|---|---|---|
| *B01D 63/08* | (2006.01) | |
| *B01D 65/02* | (2006.01) | |
| *B01D 69/02* | (2006.01) | |
| *B01D 69/06* | (2006.01) | |
| *C02F 1/44* | (2023.01) | |

(52) U.S. Cl.
CPC ......... *B01D 63/089* (2022.08); *B01D 63/081* (2013.01); *B01D 65/02* (2013.01);
(Continued)

(58) Field of Classification Search
CPC ...... B01D 63/081; B01D 65/02; B01D 69/02; B01D 69/06; B01D 2313/06;
(Continued)

(56) References Cited

U.S. PATENT DOCUMENTS

2008/0000827 A1*  1/2008  Bruss ................... B01D 63/082
                                                        210/489
2010/0269464 A1   10/2010  Mori et al.
(Continued)

FOREIGN PATENT DOCUMENTS

JP          6017402 B2    11/2016
KR       10-0479427 B1     3/2005
(Continued)

OTHER PUBLICATIONS

"Polypropylene", Wikipedia, https://en.wikipedia.org/wiki/Polypropylene, obtained from Web on Feb. 24, 2022, 18 total pages. (Year: 2022).*
(Continued)

*Primary Examiner* — Jonathan M Peo
(74) *Attorney, Agent, or Firm* — The Thornton Firm, LLC

(57) ABSTRACT

A bendable flexible flat membrane module includes: a membrane facing each other and constituting both outer surfaces; a support member made of a flexible material and embedded inside the membrane constituting the both outer surfaces; and a plurality of point bonding portions formed by pressing and bonding the both outer surfaces facing each other at a predetermined point.

3 Claims, 6 Drawing Sheets

(52) U.S. Cl.
CPC ........... *B01D 69/02* (2013.01); *B01D 69/061* (2022.08); *C02F 1/44* (2013.01); *B01D 2313/042* (2022.08); *B01D 2313/06* (2013.01); *B01D 2313/10* (2013.01); *B01D 2313/12* (2013.01); *B01D 2321/04* (2013.01); *B01D 2325/24* (2013.01); *C02F 2303/16* (2013.01)

(58) Field of Classification Search
CPC ............ B01D 2313/10; B01D 2313/12; B01D 2325/24; C02F 1/44; C02F 2303/16
See application file for complete search history.

(56) References Cited

U.S. PATENT DOCUMENTS

2013/0092621 A1* 4/2013 Tomescu .............. B01D 65/022
156/243

2015/0027948 A1 1/2015 Doyen et al.

FOREIGN PATENT DOCUMENTS

| KR | 10-0720043 | B1 | | 5/2007 | |
|----|------------|----|---|--------|---|
| KR | 10-0766569 | B1 | | 10/2007 | |
| KR | 10-1007878 | B1 | | 1/2011 | |
| KR | 10-1199314 | B1 | | 11/2012 | |
| KR | 10-2013-0091656 | A | | 8/2013 | |
| KR | 10-2014-0130459 | A | | 11/2014 | |
| KR | 10-2015-0095111 | A | | 8/2015 | |
| KR | 20150095111 | A | * | 8/2015 | ............ B01D 61/14 |
| KR | 10-2018-0018439 | A | | 2/2018 | |

OTHER PUBLICATIONS

International Search Report for PCT/KR2018/013977 mailed Mar. 11, 2019 from Korean Intellectual Property Office.

* cited by examiner

BENDABLE FLEXIBLE FLAT MEMBRANE MODULE AND METHOD FOR MANUFACTURING SAME

TECHNICAL FIELD

The present invention relates to a bendable flexible flat membrane module and a method of manufacturing the same, and more particularly, to a bendable flexible flat membrane module capable of freely moving and being freely bent by a user's choice by using a flexible material as an inner member, thereby facilitating backwashing and enabling mass production, and a method of manufacturing the same.

In addition, the present invention relates to a bendable flexible flat membrane module capable of maximizing grease cleaning by air bubbles while deforming a shape of a membrane into a zigzag shape using a flexible membrane and an operation bar, and a method of manufacturing the same.

BACKGROUND ART

Generally, water purification refers to a process in which turbid water is treated (purified) for a purpose of drinking, industrial use, or agricultural use through self-purification, purification of the earth, or other artificial treatment.

For example, a water supply system is a system supplying water that may be trusted and drunk through a water pipe, and the drinking water finally supplied to a user through the water pipe should be purified so as to meet water quality standards. Therefore, when it is possible to obtain high quality raw water close to a target water quality, a simple water treatment may be sufficient. However, water treatment is not easy in a downstream part of a large river in which many cities, factories or agricultural lands are located, and thus a separate water treatment facility should be provided.

FIG. 1 is a perspective view of a filter medium according to the related art. In the related art, the water to be filtered is described without distinction, but it should be noted that it may be applied to both a water purification device for filtering clean water and a sewage treatment device for filtering sewage at a sewage treatment plant.

As shown in FIG. 1, a filter medium 10 according to the related art includes a membrane 11 and an inner member 12 bonded to an inner surface of the membrane 11.

The membrane 11 is formed of a polytetrafluoroethylene (PTFE) membrane or a polymer membrane, which is a very stable compound due to strong chemical bonding between fluorine and carbon among fluorine resins performing a surface filtration function. Thereamong, the PTFE membrane has properties such as almost complete chemical inertness, heat resistance, non-tackiness, excellent insulation stability, and low coefficient of friction. Preferably, a pore size of the membrane 11 ranges from several tens of micrometers to 0.001 μm depending on characteristics of the water purification device, and a thickness of the membrane 11 is about 10 μm.

However, in a conventional filter, since the inner member 12 is formed of a rigid material and the membrane 11 is bonded to the inner member 12, there is a problem in that it is difficult to effectively remove foreign matters sticking to an outer surface of the membrane 11. Generally, backwashing should be performed to remove foreign matters, which makes it difficult for washing water to pass through the pores of the membrane 11 during backwashing, so that there is a problem is that the membrane 11 is swollen.

PRIOR ART LITERATURE

Patent Literature (Patent Document 1) 1. Korean Laid-open Patent Application No. 10-1007878 (Jan. 6, 2011)
(Patent Document 2) 2. Korean Patent No. 10-2016-0095111 (Aug. 20, 2015)

DISCLOSURE

Technical Problem

An aspect of the present invention is to solve the above described problems and provide a bendable flexible flat membrane module capable of moving filtration water or washing water more smoothly, and a method of manufacturing the same.

Another aspect of the present invention is to provide a bendable flexible flat membrane module capable of improving workability without requiring a support frame and enabling mass production, and a method of manufacturing the same.

Still another aspect of the present invention is to provide a bendable flexible flat membrane module that enables a smooth flow of water during backwashing and a method of manufacturing the same.

Still another aspect of the present invention is to provide a bendable flexible flat membrane module capable of maximizing grease cleaning by air bubbles while deforming a shape of a membrane into a zigzag shape using an operation bar, and a method of manufacturing the same.

Still another aspect of the present invention is to provide a bendable flexible flat membrane module capable of performing backwashing effectively through efficient grease cleaning of a membrane flat membrane module, and a method of manufacturing the same.

Technical Solution

In order to achieve the above object, a bendable flexible flat membrane module according to an embodiment of the present invention includes: a membrane facing each other and constituting both outer surfaces; a support member made of a flexible material and embedded inside the membrane constituting the both outer surfaces; and a plurality of point bonding portions formed by pressing and bonding the both outer surfaces facing each other at a predetermined point.

The plurality of point bonding portions are formed to be spaced apart at a predetermined distance from each other.

A flow path is formed between the plurality of point bonding portions.

A water supply and collection pipe formed of a flexible material, and extending from an upper portion to a lower portion of the membrane flat membrane module to be embedded therein is further included.

A bendable flexible flat membrane module according to another embodiment of the present invention includes: a membrane facing each other and constituting both outer surfaces; a pair of support members made of a flexible material and embedded in the membrane constituting the both outer surfaces; an intermediate member made of a porous material and inserted between the pair of support members; and a plurality of point bonding portions formed by pressing and bonding the both outer surfaces facing each other at a predetermined point.

A method of manufacturing a bendable flexible flat membrane module according to the present invention includes: a step (a) of attaching a support member made of a flexible material to a membrane; a step (b) of contacting a pair of membranes to which the support member is attached so that the support member faces each other; and a step (c) of forming a plurality of point bonding portions on both outer surfaces of the membrane.

In the step (a), the support member is bonded to the membrane by a heat lamination method.

A method of bonding the plurality of point bonding portions uses any one of a method of bonding using rivets, a method of bonding using sawing, and a method of bonding using an ultrasonic wave or a heat lamination.

Advantageous Effects

According to the present invention, filtration water or washing water may be moved more smoothly.

In addition, according to the present invention, it is possible to improve the workability without requiring a support frame, and to enable mass production.

Further, according to the present invention, it is possible to smoothly flow water during backwashing, thereby preventing the membrane from swelling.

[Description of Reference Numerals]

| | |
|---|---|
| 100: Membrane flat membrane module | 110: Membrane |
| 111, 112: Both outer surfaces | 120: Support member |
| 130: Point bonding portion | 135: Flow path |

140: Intermediate member

MODES OF THE INVENTION

Hereinafter, a bendable flexible flat membrane module according to the present invention will be described in detail with reference to the accompanying drawings.

Figure 1:
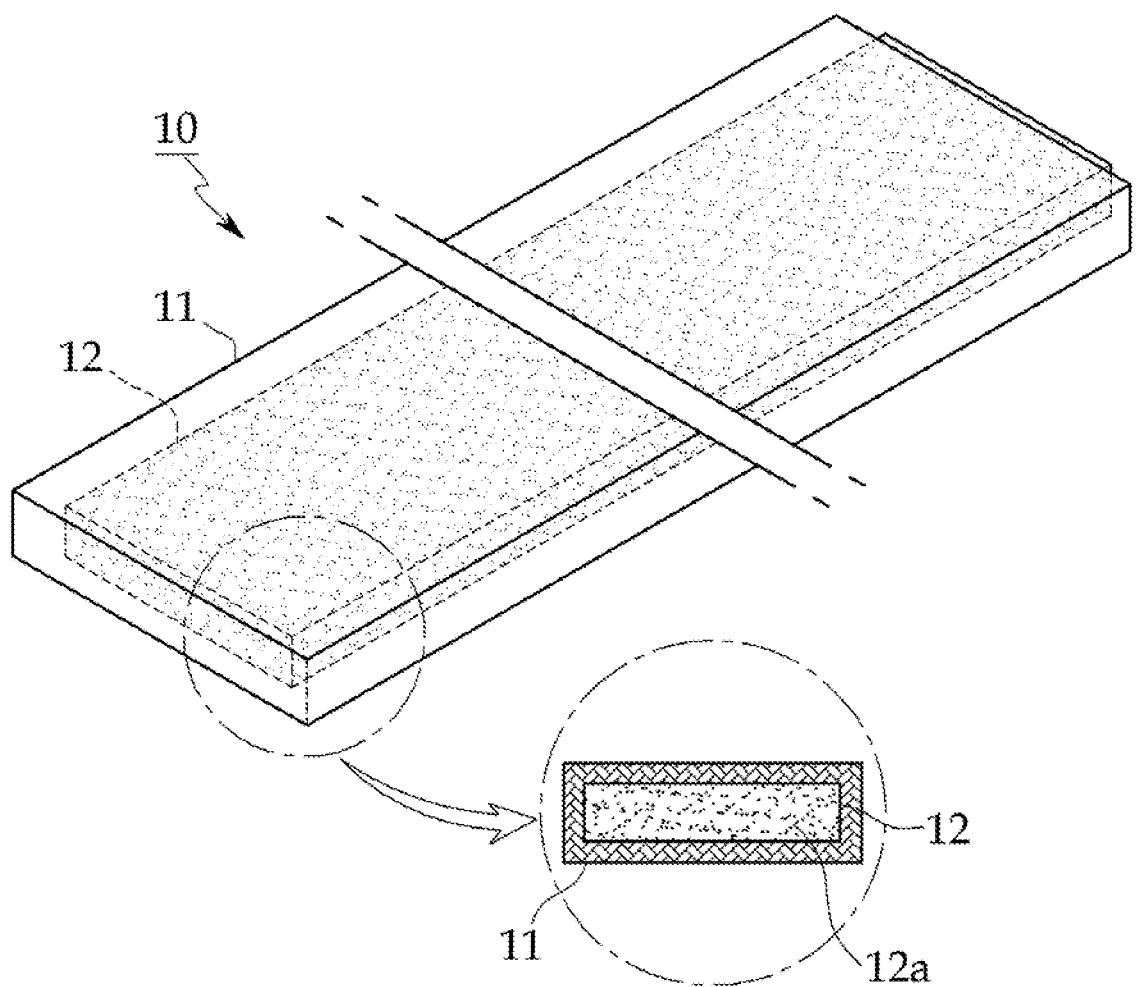
FIG. 1 is a perspective view of a filter medium according to the related art.
Figure 2:
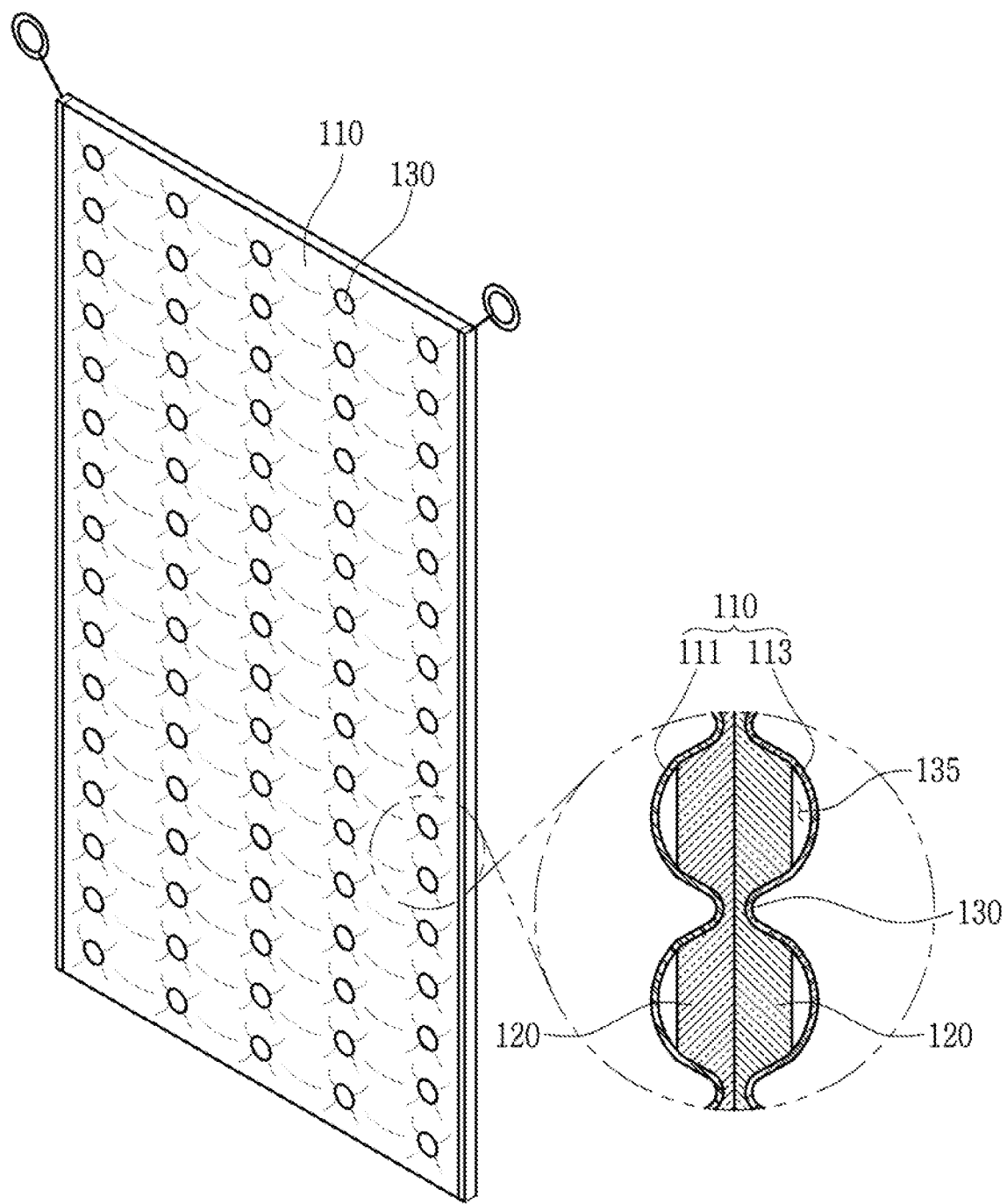
FIG. 2 is a perspective view illustrating a bendable flexible flat membrane module according to an embodiment of the present invention.

As shown in FIG. 2, the bendable flexible flat membrane module according to the present invention includes a membrane 110 facing each other and constituting both outer surfaces, and a support member 120 of a flexible material embedded in the membrane 110 constituting both outer surfaces 111 and 113.

The membrane 110 uses a polytetrafluoroethylene (PTFE) membrane or a polymer membrane, which is a very stable compound due to strong chemical bonding between fluorine and carbon among fluorine resins performing a surface filtration function.

The support member 120 made of a flexible material may be a flexible non-woven material.

In addition, the membrane flat membrane module 100 according to the present invention includes a plurality of point bonding portions 130 on the both outer surfaces 111 and 113.

The point bonding portion 130 is formed by pressing and bonding the both outer surfaces 111 and 113 facing each other at a predetermined point.

As the bonding method, various methods may be used, and for example, a bonding method such as a method by coupling means such as a rivet, a sawing method, or a method by an ultrasonic wave or a heat lamination may be used.

In addition, the plurality of point bonding portions 130 may be formed to be spaced apart at a predetermined distance from each other, and are formed by physically pressing and bonding the both outer surfaces 111 and 113.

When the plurality of point bonding portions 130 are formed as described above, as the outer surfaces 111 and 113 of the membrane 110 are pressed by the point bonding portions 130, a flow path 135 is formed between each of the point bonding portions 130. Therefore, filtration water or washing water may smoothly move via the pores of the support member 120 and the flow paths 135.

Figure 3:
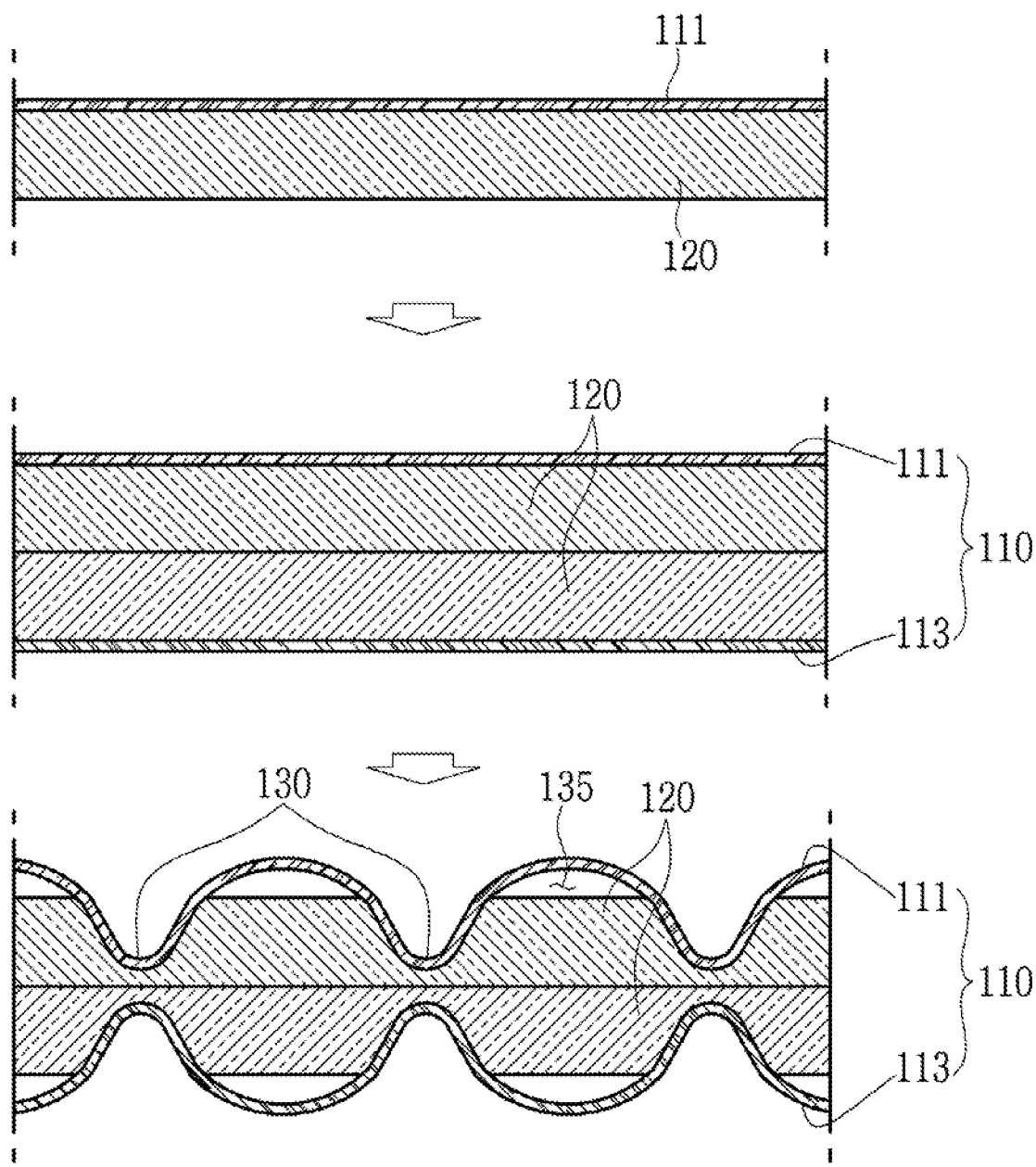
FIG. 3 is a cross-sectional view illustrating a manufacturing process of a bendable flexible flat membrane module according to an embodiment of the present invention.

Hereinafter, a method of manufacturing a bendable flexible flat membrane module according to the present invention will be described with reference to FIG. 3.

(a) The support member 120 made of a flexible material is attached to the membrane 110.

The support member 120 made of a flexible material may be a flexible non-woven material.

In this case, the support member 120 may be made of a flexible synthetic resin material such as foamable polypropylene or foamable polyethylene, and a plurality of pores are formed therein. Front, rear, left, right, and lower surfaces of the support member 120 are formed to be surrounded by the membrane 110. In addition, since a melting point of the support member 120 is about 160° C., which is lower than that of the membrane 110 and about 260° C., when the support member 120 is heated to 160° C. or higher, as the surface melts, the support member 120 is laminated to the membrane 110.

Although the support member 120 is described as being bonded to the membrane 110 by a heat lamination method, the present invention is not limited thereto. For example, in the present invention, the support member 120 and the membrane 110 may be bonded to each other in a bonding manner by applying an adhesive in the form of a dot or a mesh to an outer surface of the support member 120 and/or an inner surface of the membrane 110.

The membrane flat membrane module 100 fabricated by laminating the membrane 110 and the support member 120 therein is formed into the form of a thin and long flexible fabric.

(b) The pair of membranes 110 to which the support members 120 are attached are brought into contact so that the support members face each other.

The support member 120 functions as a flow path through which water filtered by passing through the membrane 110 moves via pores therein.

(c) A plurality of point bonding portions are formed on both outer surfaces of the membrane 110.

The point bonding portion 130 is formed by pressing and bonding the both outer surfaces 111 and 113 facing each other at a predetermined point.

As the bonding method, various methods may be used, and for example, a bonding method such as a method by coupling means such as a rivet, a sawing method, or a method by an ultrasonic wave or a heat lamination may be used.

In addition, the plurality of point bonding portions 130 may be formed to be spaced apart from each other at a predetermined distance, and are formed by physically pressing and bonding the both outer surfaces 111 and 113.

As described above, in the membrane flat membrane module 100 according to the present invention, the support member 120 is embedded in the membrane 110, and the plurality of point bonding portions 130 as described above are provided, thereby forming the plurality of flow paths 135.

In addition, the membrane flat membrane module 100 according to the present invention is made of a flexible material, so the membrane flat membrane module 100 may move freely, and may be bent freely, thereby facilitating backwashing and enabling mass production.

Figure 4:
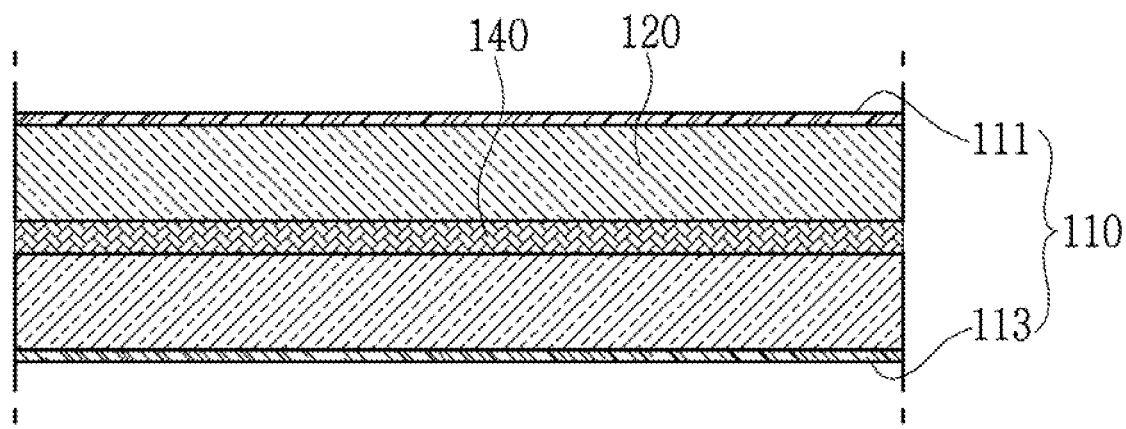
FIG. 4 is a cross-sectional view of a bendable flexible flat membrane module according to another embodiment of the present invention.

FIG. 4 is a cross-sectional view of a bendable flexible flat membrane module according to another embodiment of the present invention.

The bendable flexible flat membrane module according to another embodiment of the present invention is the same as the construction and manufacturing method of the bendable flexible flat membrane module 100 according to an embodiment of the present invention, except for additionally embedding an intermediate member 140 made of a porous material in a coupled body between the pair of membranes 110 and the support member 120.

That is, the intermediate member 140 made of the porous material is further embedded in the bendable flexible flat membrane module according to another embodiment of the present invention, thereby further increasing an amount of water flowing inside the membrane flat membrane module.

Figure 5:
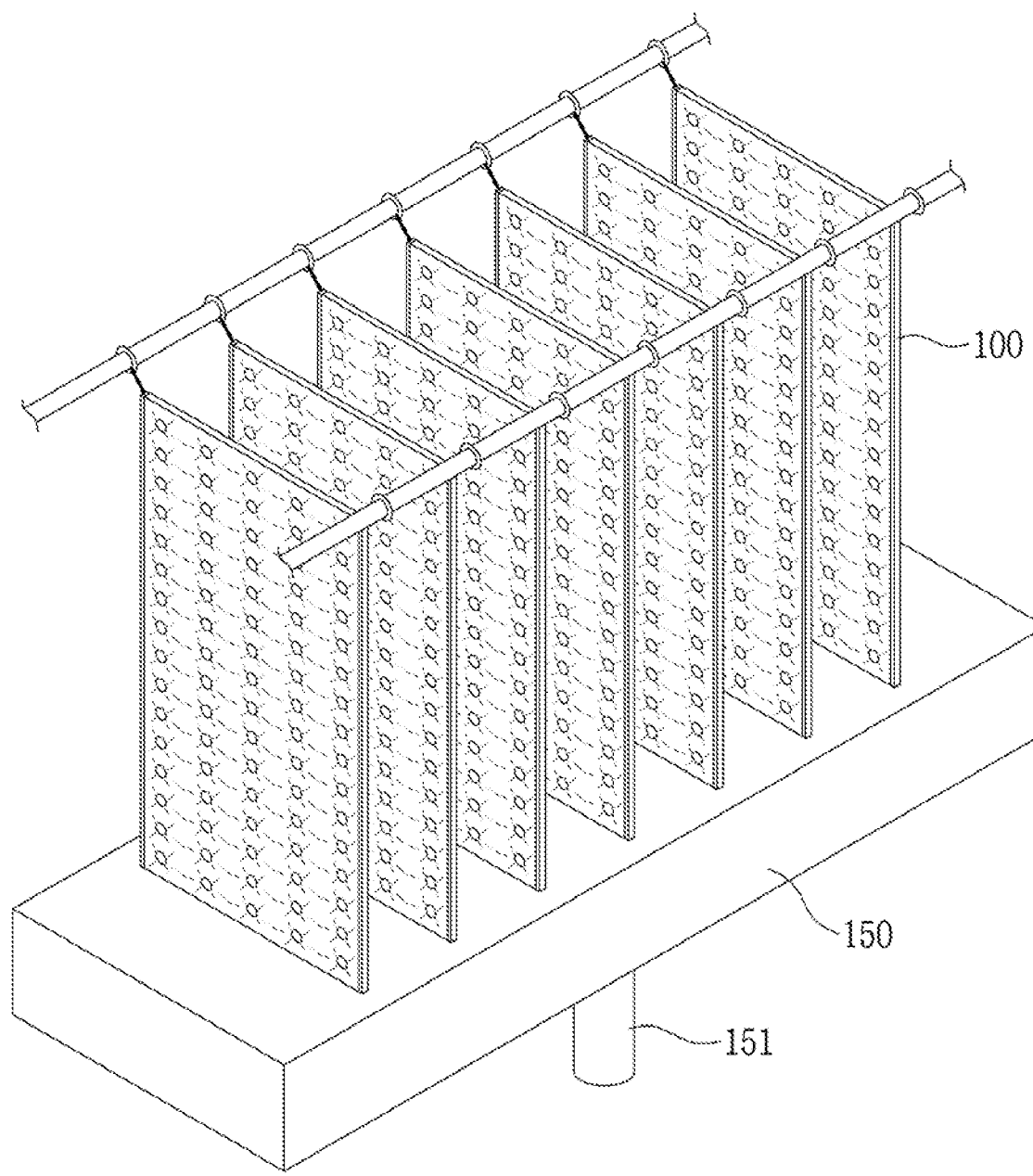
FIG. 5 is a usage state diagram of a bendable flexible flat membrane module according to the present invention.

FIG. 5 is a use state diagram of a bendable flexible flat membrane module according to the present invention.

As shown in FIG. 5, the membrane flat membrane module 100 according to the present invention may be inserted into and installed in a housing 150 to perform water purification and filtration.

The water filtered by passing through the membrane flat membrane module 100 may be discharged through an inlet/outlet 151 via the housing 150, and at the time of backwashing, the water introduced via the inlet/outlet 151 may be flowed toward the membrane flat membrane module 100, so that the membrane may be washed.

Figure 6:
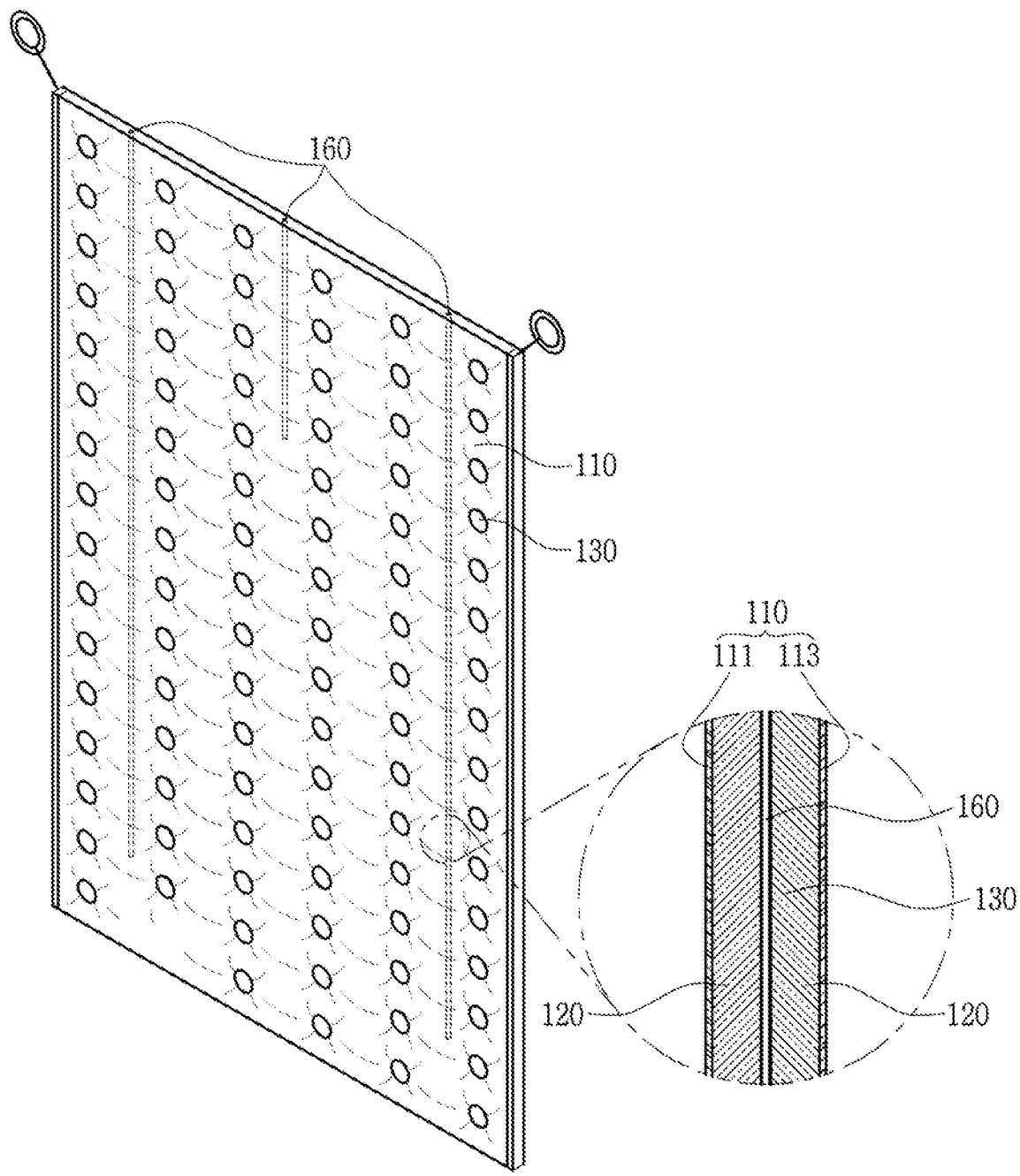
FIG. 6 is a perspective view illustrating a flexible flat membrane module according to another embodiment of the present invention.

FIG. 6 is a perspective view illustrating a flexible flat membrane module according to another embodiment of the present invention.

As shown in FIG. 6, in the membrane flat membrane module according to another embodiment of the present invention, a separate water supply and collection pipe 160 may extend from an upper portion to a lower portion to be embedded therein. The water supply and collection pipe 160 may be preferably made of a flexible material so as to be bent freely.

The water supply and collection pipe 160 is provided to prevent water supply or water collection that is performed toward a lower portion of the membrane flat membrane module from not being performed smoothly due to being far from a water supply unit or a collection unit, and water may be easily supplied or collected downwardly.

Meanwhile, the present invention is not limited by the above-described embodiments and accompanying drawings but can be modified and applied into unexemplified various forms within a scope not departing from the technical spirit of the present invention, can substitute a component, and can be changed to another equivalent embodiment. Therefore, the contents related to the modification and application of characteristics of the present invention should be understood to be included in the scope of the present invention.

The invention claimed is:

1. A method of manufacturing a bendable flexible flat membrane module that enables a flow of filtered water that has been filtered or washing water for backwashing, the method comprising:
   a step (a) of attaching a first support member made of a first flexible material made of a flexible synthetic resin material having a plurality of pores therein to a first PTFE membrane to prepare a first half membrane;
   a step (a-1) of attaching a second support member made of a second flexible material made of a flexible synthetic resin material having a plurality of pores therein to a second PTFE membrane to prepare a second half membrane;
   a step (b) of attaching the first and second half membranes to prepare a pair of membranes having a first PTFE outer surface and a second PTFE outer surface, the first support member and the second support member facing each other, and
   a step (c) of pressing and bonding a same part of the first and second PTFE outer surfaces at predetermined intervals together forming a plurality of point bonding portions on the first and second PTFE outer surfaces of the pair of membranes by pressing and bonding at a predetermined point, wherein a method of the bonding uses one selected from the group consisting of rivets, sawing, ultrasonic waves, and heat lamination, wherein, by the step (c) of pressing and bonding, a flow path is formed between the first support member and the first PTFE outer surface, between the second support member and the second PTFE outer surface, and between each of the plurality of point bonding portions, such that, using an operation bar, the filtered water or washing water may deform the shape of the membranes into a zigzag shape and move the filtered water or washing water via the plurality of pores of the first support member, the plurality of pores of the second support member, and the flow path formed between the first support member and the first PTFE outer surface and between the second support member and the second PTFE outer surface.

2. The method of claim 1, wherein, in the step (a), the first support member having the plurality of pores therein is bonded to the first PTFE membrane by a heat lamination method and the second support member having the plurality of pores therein is bonded to the second PTFE membrane by a pressing and bonding method.

3. The method of claim 1 wherein an intermediate member having a plurality of pores therein is embedded between the first half membrane and the second half membrane.

* * * * *